Feb. 15, 1927.

H. A. AFFEL ET AL 1,617,935

MULTIPLEX TELEGRAPHY BY PHASE DISCRIMINATION

Filed Jan. 7, 1925

6 Sheets-Sheet 1

INVENTORS
*H. A. Affel and*
BY *R. W. Deardorff*

ATTORNEY

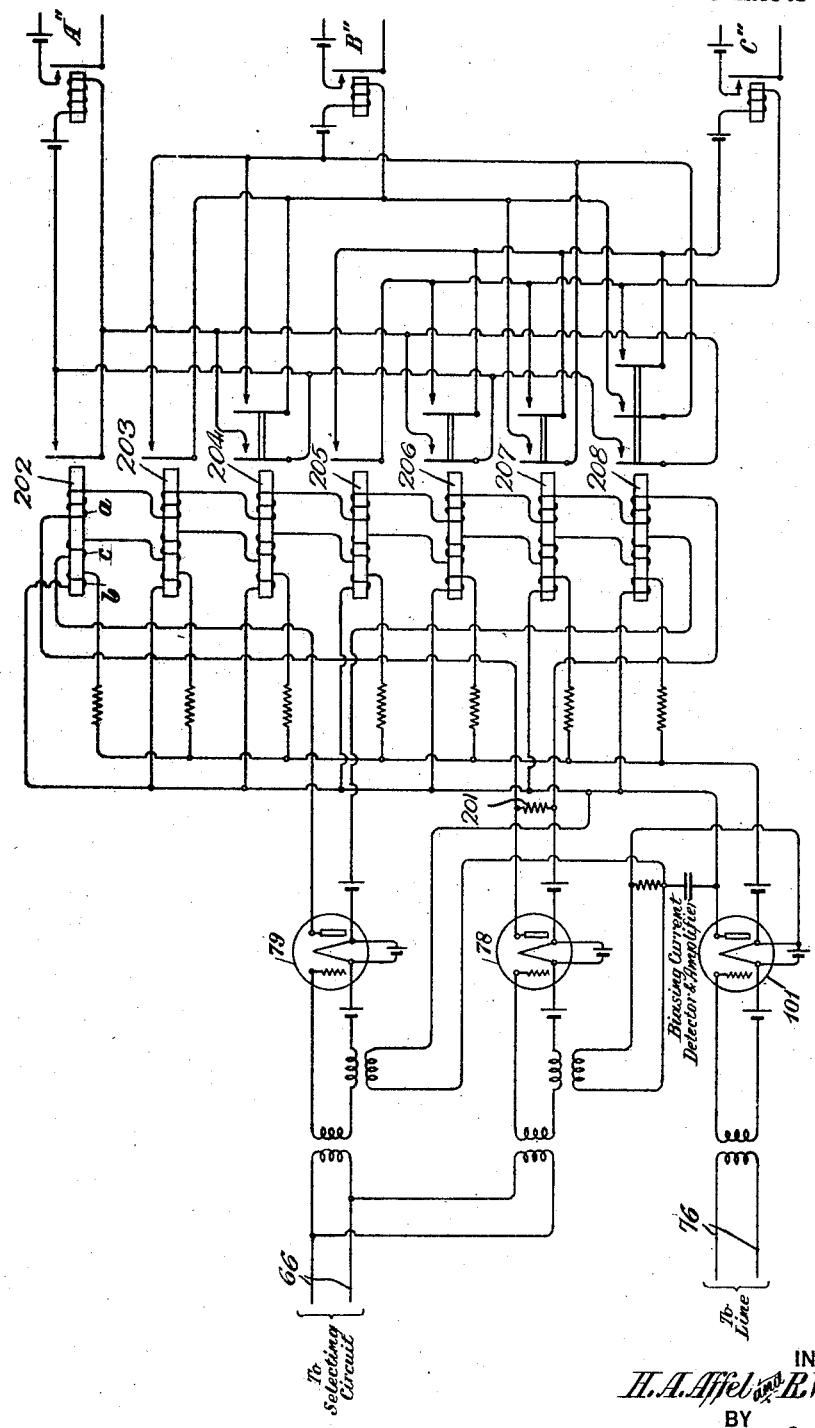

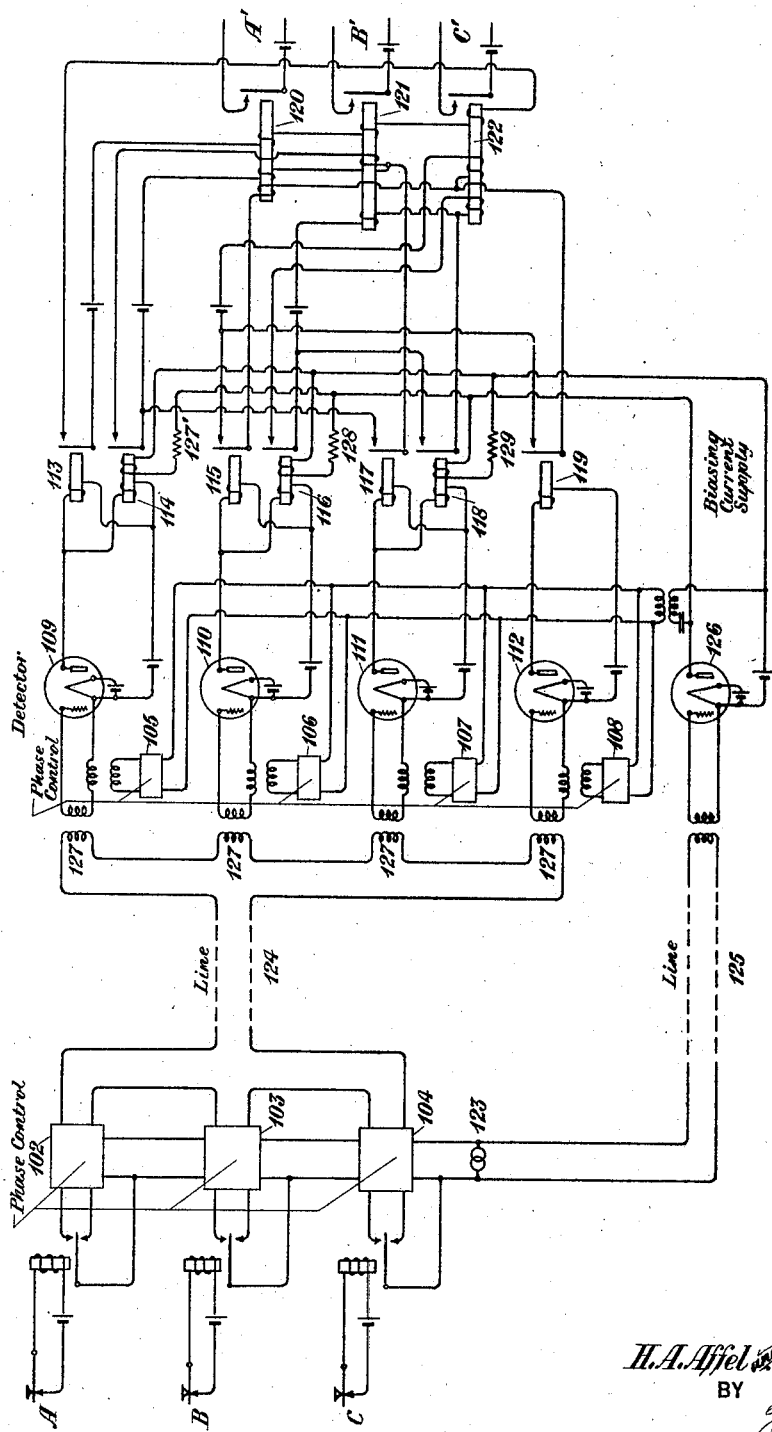

Patented Feb. 15, 1927.

1,617,935

UNITED STATES PATENT OFFICE.

HERMAN A. AFFEL, OF MAPLEWOOD, NEW JERSEY, AND RALPH W. DEARDORFF, OF KENSINGTON, CALIFORNIA, ASSIGNORS TO AMERICAN TELEPHONE AND TELEGRAPH COMPANY, A CORPORATION OF NEW YORK.

MULTIPLEX TELEGRAPHY BY PHASE DISCRIMINATION.

Application filed January 7, 1925. Serial No. 1,050.

An object of our invention is to provide new and improved apparatus and corresponding method for transmitting over a line several messages, some of which are on carrier currents of the same frequency, discrimination being made between them by means of difference in phase, using a similar line for transmitting a control frequency. This and other objects of our invention will become apparent on consideration of a limited number of specific examples of practice according to the invention, which we have illustrated in the accompanying drawings and which we now proceed to describe in the following specification. It will be understood that this description relates to these examples of the invention and that the invention is defined in the appended claims.

Figure 1:
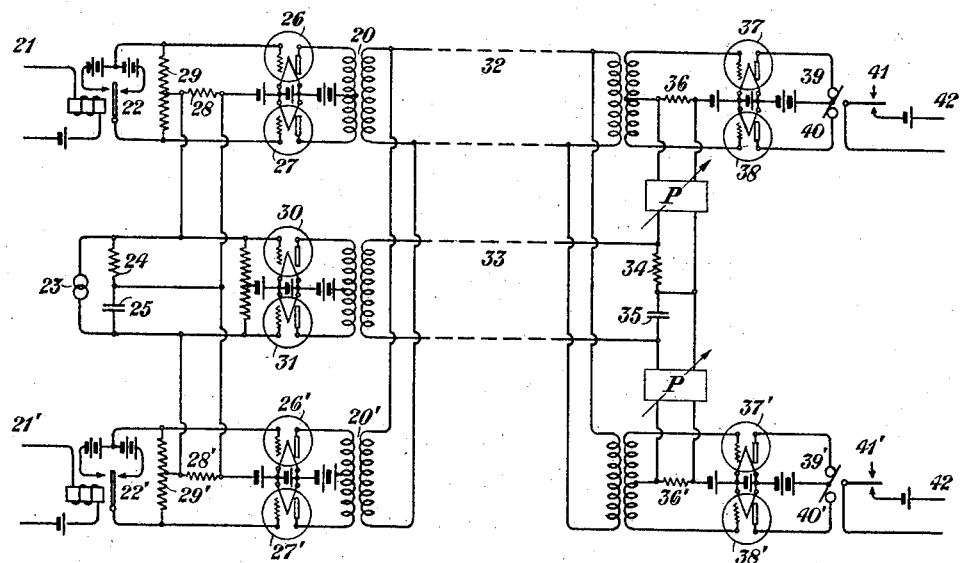
Figure 2:
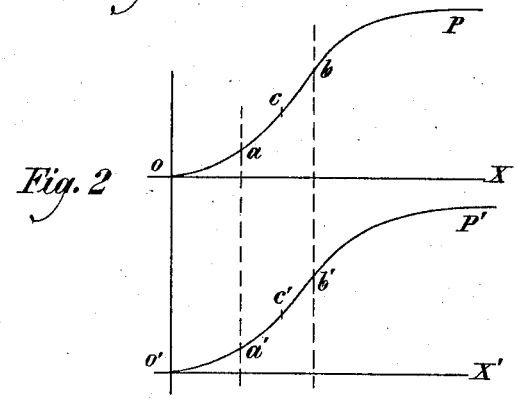
Figure 3:
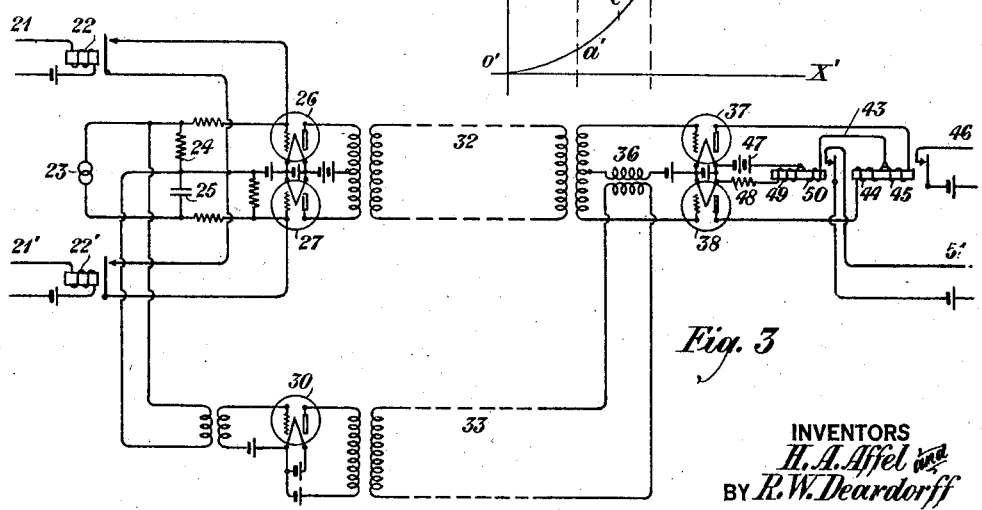
Figure 4:
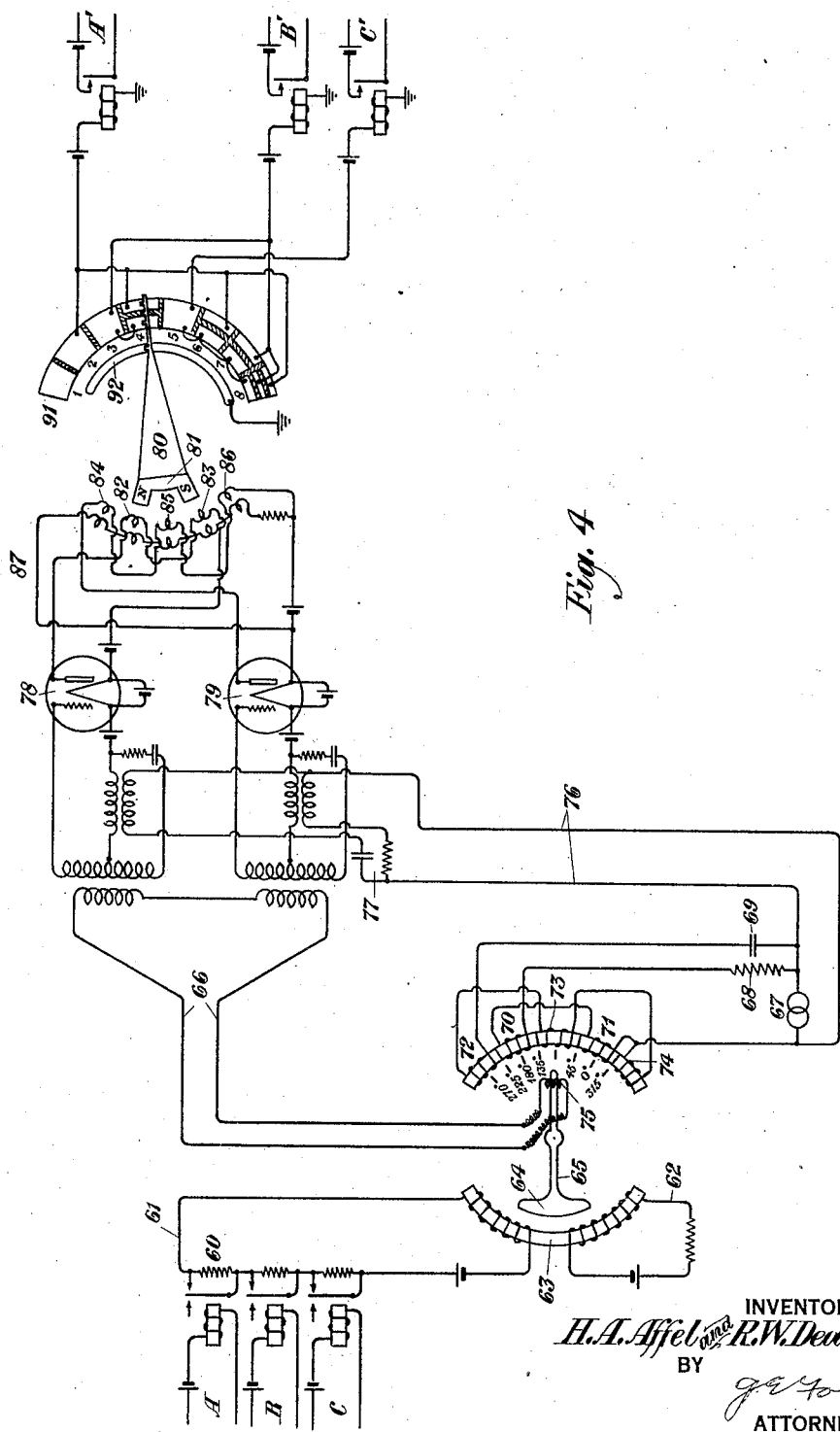
Figure 5:
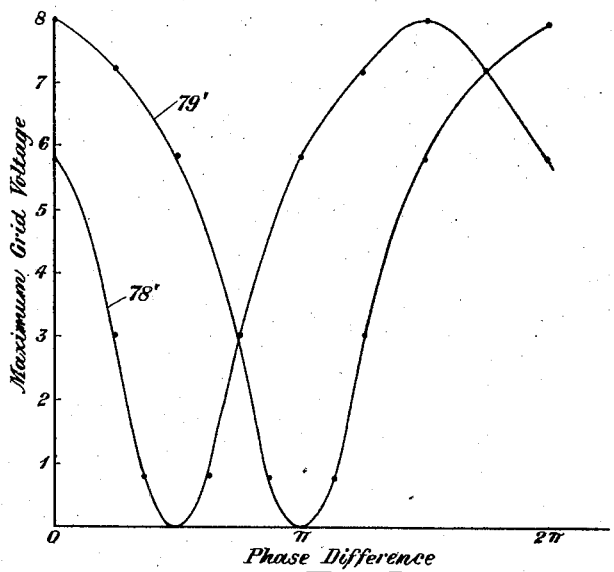
Figure 5A:
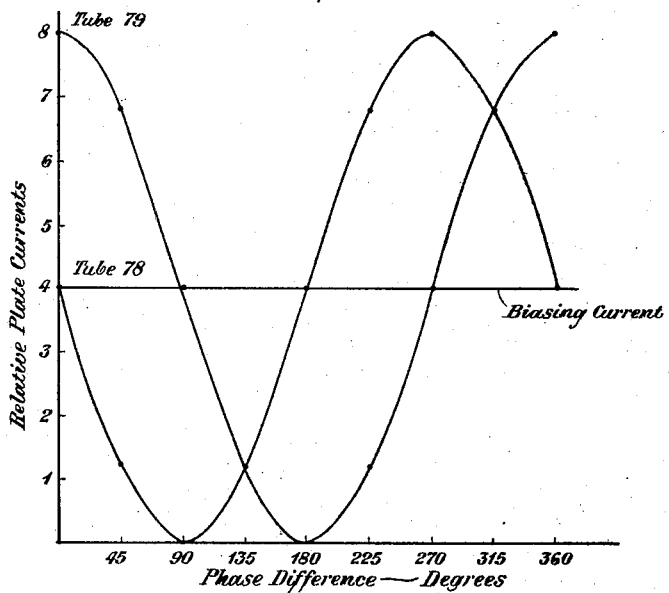
Figure 6:
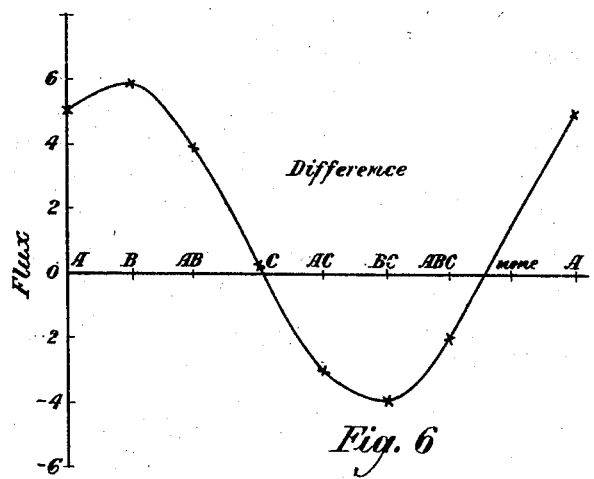
Figure 7:
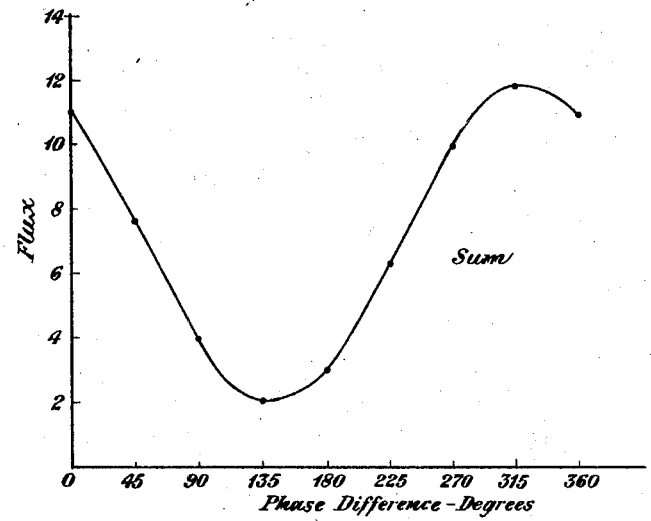

Referring to the drawings, Figure 1 is a diagram of a two-phase system; Fig. 2 gives certain vacuum tube characteristics that will be referred to in connection with Fig. 1; Fig. 3 is a diagram of another two-phase system in which there has been some simplification by combining certain elements; Fig. 4 is a diagram of a system involving discrimination by phase between three channels using a rotating phase selector; Figs. 5 and 5A are curve diagrams that will be referred to in connection with Fig. 4; Figs. 6 and 7 are additional curve diagrams; Fig. 8 is a diagram of a modified receiving system in which three channels are discriminated by means of phase differences and marginal relays; and Fig. 9 illustrates another method for providing 3 channels by a different use of tubes and relays.

In the system of Fig. 1, the two circuits 21 and 21' are controlled by telegraph keys or equivalent apparatus. The generator 23 of a particular carrier current frequency has a resistance 24 and a condenser 25 in series across its terminals, so that in the respective branch circuits shown the currents in resistances 28 and 28' are 90 degrees apart in phase. The potential drop across resistance 28 is applied to the grids of the two vacuum tubes 26 and 27 which form a balanced modulator, the same magnitude and polarity being supplied to both grids.

The sending circuit 21, controls a relay 22, which reverses the $d-c$ potential difference between these two grids. If both grids were at the same potential, such as $a$ and $a'$ on Fig. 2, the outputs of the tubes 26 and 27 being equal would neutralize each other in the transformer 20, producing no output to the line 32. However, when the relay 22 is in the open position, the grid potential of tube 26 is reduced to the point zero of its characteristic, shown in Fig. 2, and the grid potential of tube 27 is raised to $b'$. Since this reduces the output of tube 26 and increases the output of tube 27, the two outputs will no longer neutralize each other, and a current will be transmitted to the line, due to the predominance of current from tube 27. In the same way when the relay 22 is closed the potentials of the two grids are reversed, causing the current from tube 26 to predominate in the transformer 20 and to be transmitted to the line. In other words the phase is reversed.

Similarly, the carrier current differing 90 degrees in phase and controlled by the signal circuit 21' is put on the line 32 from the balanced modulating tubes 26' and 27'.

Carrier current of the same frequency from the generator 23 is put through the balanced amplifying tubes 30 and 31 and sent to the receiving station over another line 33, where it goes to a phase splitter 34, 35, the output current of one phase going to the resistance 36 and serving as the homodyne current for the demodulator 37, 38.

The modulated carrier currents of both phases in the line 32 go to both demodulators. The effect in a demodulator is measured by the product of the two currents, and such a product is substantially zero when the currents are 90 degrees apart in phase, whereas the products are of substantial value when the currents are in phase. Also the current transmitted over the other line 33 is subject to the same phase changes as that transmitted over line 32 or if not it can be shifted in phase to agree, by means of the phase adjusters P. Consequently, the voltages supplied to resistances 36 and 36' are exactly in phase with those received from 20 and 20' respectively.

Since the homodyne voltage from resistance 36 is supplied to both grids, it is evident that on one grid it will aid and on the other it will oppose the voltage transmitted from the transformer 20. Therefore, when this homodyne voltage across resistance 36 is made equal in magnitude to the voltage across grid and filament in either tube 37 or 38 as transmitted from transformer 20, then the effect in the output of one tube, 38 for example, will be zero while the output of the other tube, 37, will be a rectified current which will flow through the relay winding 39 and cause the relay armature 41 to be operated in one direction, transmitting a signal to the local receiving apparatus 42. If now, the current transmitted from the transformer 20 is reversed in phase, by operation of the control circuit 21, it is evident that the effect in tube 37 will be reduced to zero and a current will flow in relay winding 40, thus operating the armature 41 in the opposite direction, since it is a polar relay connected differentially in the circuit.

In the same way, demodulator 37', 38' is supplied through the resistance 36' with homodyne voltage, which is exactly in phase with that received from transformer 20' and is 90 degrees away from the two voltages which are effective on the demodulator 37, 38, as described above. It is apparent then that each channel will be operated by its own currents and will not affect the other channel.

In the simplified system of Fig. 3 the generator 23 delivers its carrier current to the phase splitter 24, 25, so that an electromotive force of one phase is impressed on the grid of the tube 26 and an electromotive force 90 degrees away from it is impressed on the grid of the tube 27. Signaling is accomplished over the circuit 21 by shorting the grid of the tube 26 to the filament upon closure of the armature 22 for the spacing elements of the signals. For a marking element of a signal, the armature 22 is drawn from its back contact and the carrier current electromotive force is applied to the grid of the tube 26. Similarly, the carrier current of the other phase is controlled from the circuit 21' and the switch 22'. Thus the signals consist of wave trains of carrier current in dots and dashes in two respective phases 90 degrees apart superposed in the line 32.

Current of one of the two phases is also sent through the amplifier 30 over the line 33 and applied as the homodyne current for the demodulator 37, 38. The polar relay 44, 45 is connected differentially in the two plate circuits of the tubes 37 and 38 and it gives no response for the pure current coming in over the line 33. But received current of phase controlled by circuit 21 will when added to the homodyne current in the demodulator, actuate the relay 44, 45 because of the current from the line 32 and from the line 33 will be in phase for the tube 37 but in opposition for the tube 38.

When no current is being received from tube 26 over the line 32, the homodyne current received over the line 33 has an equal effect on the two tubes 37, 38, raising the plate currents from $a$ and $a'$ in Fig. 2 to $c$ and $c'$, respectively. Since the relay windings 44 and 45 are connected differentially, these balanced currents have no effect on this relay. When, however, the current from 26 is transmitted, it neutralizes the homodyne voltage in tube 38 and adds to it in tube 37; decreasing the current in winding 44 to the point $a'$ in Fig. 2, and increasing the current in winding 45 to the point $b$, thus operating the relay in one direction. Then when the output from tube 26 is cut off (by operation of the control circuit 21) the current in winding 44 is increased to $c'$ (Fig. 2) and that in winding 45 is decreased to $c$, causing the relay to operate in the other direction.

Since it is obvious that a uniform increase in the current of both tubes will not operate the relay, it is equally apparent that the current from tube 27 being 90 degrees out of phase with the homodyne current from the transformer 36 will not interfere with the signals between the local circuits 21 and 46.

The current from tube 27, which is 90 degrees out of phase with that from tube 26, is transmitted over the same line 32 and causes an increase in the plate current of both tubes 37 and 38 of the demodulator. It will be noted that the winding 50 of another relay is connected in the common lead through which pass the plate currents of both tubes.

Any increase or decrease in the plate current of both tubes will affect this relay but a change which is an increase for one tube and a decrease for the other, particularly when these two changes are approximately equal, will have only a very small effect on the current flowing through this relay 50. In order to make this relay operate without bias, another winding 49 is used which makes the relay open when the current through the main winding 50 drops below a given value.

It is evident, then, that signals on the channel terminating at 21' and 51 will not interfere with signals on the 21—46 channel. Also, although the signals on the 21—46 channel will have some effect on the receiving relay of the 21'—51 channel, that effect will be small and not enough to interfere with its proper operation.

Referring to Fig. 4, this shows a system designed to distinguish three message channels in accordance with phase. At the sending end the core 63 is permanently energized by biasing current in the circuit 62. The core 63 is further energized by current in the circuit 61, which comprises the three resistances 60 in series. These three resistances in series reduce the current in the circuit 61 to a very low value. When each of the three signaling circuits A, B and C is closed corresponding to "spacing" condition, all three resistances 60 are in series and the current in the circuit 61 is at a minimum. When the circuit A only is opened, the upper resistance 60 is shunted out giving a current of intensity $m$ in circuit 61. Similarly, opening of circuit B only makes the current intensity $m+a$ in circuit 61 and opening of circuit C only makes it $m+2a$. This gives the following table:

| Opening of circuit. | Approximate current intensity in circuit 61. |
| --- | --- |
| None. | Very small. |
| A | $m$ |
| B | $m+a$ |
| C | $m+2a$ |
| A and B | $m+3a$ |
| A and C | $m+4a$ |
| B and C | $m+5a$ |
| A, B and C | $m+6a$ |

Thus it will be seen that the current in circuit 61 distinguishes by its magnitude the various circuits and combinations of circuits which may be opened at one time among A, B and C. For the purpose intended it will be evident that the relations indicated in the foregoing table need not be exact.

The armature 64, pivoted on the arm 65, will be shifted accordingly and will swing the coil 75 to a corresponding angular position.

The carrier current generator 67 has its phase split at 68, 69 and the current of one phase goes through the windings 70 and 71, while the current of the other phase goes through the windings 72, 73 and 74. The arrangement is such that currents in consecutive windings will differ by 90 degrees, and if the coil 75 is held in front of one of these five windings, it will have induced in it current of the corresponding phase. Moreover, if the coil 75 is held half-way between two consecutive windings such as 70 and 72, the induced current in 75 will be of an intermediate phase. In this way the coil 75 will have induced in it currents of eight different phases according to the eight positions which it may take, as indicated in Fig. 4.

Accordingly, the carrier current generator 67 puts on the line 66 a carrier current of definite frequency and with its phase determined at any one of eight angular values according to the signal circuits that are opened at A, B and C. Current from generator 67 is also sent directly over another line 76.

The received current from the line 66 goes to the input transformers for the two vacuum tubes 78 and 79. These are homodyne detector tubes to which are applied the steady carrier currents from the line 76 respectively of phase 90 degrees apart as determined by the phase splitter 77.

When the currents to the tube 79 from the circuits 66 and 76 are in phase, the grid voltage attains a maximum value as indicated by the ordinate of the curve 79' at abscissa zero in Fig. 5. As the phase becomes different due to phase changes in the circuit 66, the grid voltage decreases as shown by the curve 79'. For a phase difference of angular measure $\pi$ the grid voltage is zero.

The current from the circuit 76 as applied to the tube 78 leads 90 degrees compared with its application to the tube 79 and accordingly we have the corresponding curve 78' in Fig. 5.

Fig. 5$^A$ shows the plate currents in tubes 78 and 79, these currents being proportional to the square of the voltage applied to the grid. As shown in Fig. 4, the plate currents are applied to the windings 82, 83 and 84, 85, 86, respectively. The current flowing through these windings creates magnetic flux, which varies with the changes in the currents. Also, current is supplied to a biasing winding in circuit 87 which opposes the flux caused by the plate current and has half its maximum value. These windings are so arranged and so poled that the field set up by the five magnets will draw the North and South poles of the permanent magnet 81 to any one of eight positions, depending upon the phase of the current received from the line 66. This magnet 81 is mounted on a pivoted arm 80, the other end of which carries brushes which make contact with the ground circuit 92 and the insulated segments of the commutator 91. In the illustration, position 1 at the transmitting end does not correspond to position 1 at the receiving end, although it could be so arranged. However, the arrangement is such that the closing of any combination of the local circuits "A", "B" and "C" at the sending end causes the corresponding relays of the local circuits A′, B′ and C′ to close as shown in the following table:

| Sending end. | | | Receiving end. | |
|---|---|---|---|---|
| Local closed. | Position. | Phase angle. | Position. | Local closed. |
| A′B′C′ | 1 | 270 | 8 | A′B′C′ |
| B′C′ | 2 | 225 | 7 | B′C′ |
| A′C′ | 3 | 180 | 6 | A′C′ |
| C′ | 4 | 135 | 5 | C′ |
| A′B′ | 5 | 90 | 4 | A′B′ |
| B′ | 6 | 45 | 3 | B′ |
| A′ | 7 | 0 | 2 | A′ |
| None | 8 | 315 | 1 | None |

Fig. 8, shows a receiving system alternative to that of Fig. 4. Its principle of operation will be explained by the aid of the curves in Figs. 6 and 7. It includes two tubes which are supplied with homodyne voltages 90 degrees apart in phase, just as in Fig. 4. In addition another tube, 101, is used to amplify the current received from the second line, 76, which supplies the homodyne voltages for tubes 78 and 79 and also supplies biasing current for the seven relays which are shown, each having three windings. Winding "a" of one relay is connected in series with winding "a" of the next, etc., this series comprising the output of tube 78. In the same way, the seven "c" windings are connected in series to form the output of tube 79, these "c" windings being connected so that the flux caused by current flowing through them opposes the flux from the "a" windings. The biasing winding, instead of causing the relay to release (the usual function of a biasing winding), is used to hold the relay closed. When the combined flux from windings "a" and "c" in any particular relay is equal and opposite to the flux from the biasing winding "b", the resultant flux in that relay is zero and it will release, closing its back contact, which in turn closes the proper combination of local circuits A″, B″ and C″. When the total flux of windings "a" and "c" is not equal and opposite to the flux from the biasing winding, the relay armature is held closed. Since the biasing current is transmitted over a line similar to the regular line 66, its attenuation varies with that of the currents on that line, thus decreasing the necessity for adjustments.

Fig. 6 is based on Fig. 5A, which shows the plate currents in the two tubes 78 and 79. It is evident from inspection of Fig. 5A that a curve showing the difference between these two plate currents against phase angle will be of the general shape shown in Fig. 6. In order to make each of the eight phase angles have in this curve an ordinate different from each of the others, a shunt 201 is added on the output of tube 78, reducing by about 25 per cent the current through windings "a". With this modification, the resultant flux in the relay from windings "a" and "c" will be different for each of the eight phase angles marked in Fig. 6. By means of the resistances shown in series with the biasing windings, the flux from each biasing winding "b" is made equal and opposite to the combined flux from the other windings "a" and "c" for the phase angle at which that relay should release.

The seven relays numbered 202 to 208, inclusive, hold their respective armature contacts open except when the three windings a, b and c thereon are energized so as to produce a substantially null flux in the relay cores.

According to what has been shown before, the production of a null effect in a particular relay of this set of seven relays is dependent on the current coming in over the line 66 at a particular phase relation with the current on the line 76. When this phase relation has a certain value that may be called zero degrees, none of the seven relays is deenergized. At 45 degrees, relay 202 will be deenergized, causing closure of the circuit A″ corresponding to opening circuit A at the sending end. At 90 degrees, relay 203 will be deenergized leading to closure of circuit B″ corresponding to opening of circuit B at the sending end. At 135 degrees, relay 204 will be deenergized leading to closure of circuits A″ and B″ corresponding to opening of circuits A and B at the sending end. At 180 degrees, relay 205 will be deenergized leading to closure of circuit C″ corresponding to opening of circuit C at the sending end. At 225 degrees, relay 206 will be deenergized leading to closure of circuits A″ and C″ corresponding to the opening of circuits A and C at the sending end. At 270 degrees, relay 207 will be deenergized leading to closure of circuits B″ and C″ corresponding to opening of circuits B and C at the sending end. At 315 degrees, relay 208 will be deenergized leading to closure of circuits A″, B″ and C″ corresponding to opening of circuits A, B and C at the sending end.

Therefore, it is evident that for each of the seven phase angles marked on Fig. 6 only one of the seven relays will be closed, closing its proper combination of local circuits A″, B″ and C″.

It is evident, also from inspection of Fig. 7, that the relay windings could be used aiding instead of opposing and that with the proper adjustment of biasing current each relay could be made to respond to the current corresponding to its particular phase angle.

Fig. 9 shows a different device for obtaining several channels on the same frequency by phase discrimination. In this system, three channels are shown but the same method could be used to provide more or less channels. For these three channels shown, carrier current is produced by the generator 123 and altered in phase by the transmitting apparatus 102, 103, 104. Six different phases are used, and for the sake of illustration, these phases will be considered 65° apart, although other angles could be used; that is, when the local circuit "A" is open, the transmitting apparatus 102 sends out current at zero phase angle. When the local circuit "A" is closed, the phase of the transmitted current is shifted to 65°. In the same way, the transmitting apparatus 103, controlled by the local circuit "B", uses a phase displacement of 130° for the open and 195° for the closed condition of "B". Similarly, the transmitting apparatus 104 for channel 3 uses phase displacements of 260° and 325°.

It is evident, then, that for any combination of the local circuits, "A", "B" and "C" currents of three different phases are transmitted to the line 124. Also, the voltage from the generator 123 is transmitted over the spare line 125 to the amplifier 126 and used for local voltage and for biasing current in the relays, as described later.

At the receiving end the current received from the line 124 is impressed on the transformers 127, which supply input to the detectors 109, 110, 111, 112. Also, by means of the phase shifters 105, 106, 107, 108, the current received from the second line 125 is brought to the proper phase angles to neutralize the phases received from the line for four different combinations of the local transmitting circuits "A," "B" and "C." As shown in the tabulation below, the closing of all the local circuits "A," "B" and "C" causes current to be transmitted with a phase angle of 27°. This is supplied at the receiving end to the four detectors, one of which, 109, is also supplied with local voltage from the phase shifter 105, having a phase angle of 107°, which just neutralizes the received voltage, causing the plate current in the tube to become zero. This releases the armature of the relay 113 which, in turn, closes a circuit which operates relays 120, 121, 122, closing local circuits A', B' and C' to reproduce marking signals from the local circuits "A," "B" and "C" at the transmitting end.

Referring again to the tabulation, it is seen that if only "A" and "B" are closed at the transmitting end, the resultant phase angle on the detector grid, due to the transmitted currents, is 215°. This combined with the 107° local supply, produces in the tube 109 a plate current which differs from the plate current caused by the other phases used, as shown in the tabulation. By means of the resistance 127 in the biasing current supply of the relay, the biasing flux in the relay is made equal and opposite to the flux caused by this plate current. Therefore, when "A" and "B" are closed at the transmitting end, the relay 114 will release, causing current to flow in relays 120 and 121, and closing the local receiving circuits A' and B'.

In the same way, the process can be followed through for other combinations of the local circuits "A," "B" and "C," as outlined in the following tabulation:

| Keys closed | ABC | AB | AC | BC | A | B | C | None |
|---|---|---|---|---|---|---|---|---|
| Phase angle from "A" | 65 | 65 | 65 | 0 | 65 | 0 | 0 | 0 |
| Phase angle from "B" | 195 | 195 | 130 | 195 | 130 | 195 | 130 | 130 |
| Phase angle from "C" | 325 | 260 | 325 | 325 | 260 | 260 | 325 | 260 |
| Relative grid voltage | .3 | .78 | 1.26 | 1.2 | .8 | 1.26 | 1.21 | .3 |
| Relative plate current | .07 | .62 | 1.57 | 1.42 | .63 | 1.58 | 1.43 | .09 |
| Phase of grid voltage | 27° | 215° | 61° | 315° | 120° | 264° | 10° | 311° |
| Local phase on tube 109 | 107° | | | | | | | |
| Local phase on tube 110 | | | 241° | | | | | |
| Local phase on tube 111 | | | | | 300° | | | |
| Local phase on tube 112 | | | | | | | 190° | |
| Relative relay current | | 5.5 | | 10.2 | | 12.7 | | 3.8 |

It is evident that the current, when the transmitting circuits are all open, does not have the proper phase to eliminate the plate currents flowing through relays 113, 115, 117 and 119, which have no biasing winding. It is also evident that it does not have the proper value to release the armatures of relays 114, 116 and 118, which do have biasing windings. Consequently, for this condition, the local circuits A', B' and C' will stay open, corresponding to the condition of the local circuits "A," "B" and "C" at the transmitting end.

As in the previous arrangement, since the biasing current is transmitted over a line similar to the line over which the signal currents are transmitted, it is subject to the same variations in attenuation as the signal currents, thus reducing the necessity for adjustments.

We claim:

1. In a carrier current telegraph system, the method of transmitting a plurality of messages on each frequency, which consists in establishing more than two currents of that frequency but in different phase each from the others and modulating each such current for a respective message.

2. In a multiplex carrier current system, means to generate more than two currents of the same frequency but in different phase each from the others, means to modulate each such current according to a respective message, and means to superpose the modulated currents on the line.

3. In a multiplex carrier current system, means at the sending end to generate a plurality of currents of the same frequency but in different phase each from the other or others, means to modulate each such current according to a respective message, means to superpose these modulated currents on a line, means to put a single phase of the same frequency unmodulated on another line, and at the receiving end, means to apply the latter current with the others to dissociate them into respective separate message channels.

4. In a multiplex carrier current system, means to send different messages on different phases of a current of a certain frequency, means to send an unmodulated current of a single phase of that same frequency, and means to apply said latter current with the others to dissociate the others.

5. In a multiplex carrier current system, a plurality of line conductors subjected to like external conditions, means to send unmodulated current of a single phase on one such conductor, means to send modulated message currents of several different phases of current of the same frequency on another of the conductors, and means at the receiving end to apply the said unmodulated current to dissociate the other currents.

6. The method of maintaining definite phase relations among the alternating currents of a certain frequency in a multiplex carrier current system which consists in appropriating one channel to unmodulated current of that frequency and applying it at the receiving end to dissociate the other currents of differing phase of that same frequency.

In testimony whereof, I have signed my name to this specification this 16th day of December, 1924.

HERMAN A. AFFEL.

In testimony whereof, I have signed my name to this specification this 31st day of December, 1924.

RALPH W. DEARDORFF.